(No Model.)

R. LUNDELL.
ALTERNATING CURRENT MOTOR.

No. 544,261. Patented Aug. 6, 1895.

Witnesses
V. Lüer
O. H. Short

Inventor
Robert Lundell
By his Attorney
Charles J. Kintner.

UNITED STATES PATENT OFFICE.

ROBERT LUNDELL, OF BROOKLYN, NEW YORK.

ALTERNATING-CURRENT MOTOR.

SPECIFICATION forming part of Letters Patent No. 544,261, dated August 6, 1895.

Application filed October 22, 1894. Serial No. 526,531. (No model.)

*To all whom it may concern:*

Be it known that I, ROBERT LUNDELL, a citizen of the United States, residing at Brooklyn, in the county of Kings and State of New York, have made a new and useful Improvement in Alternating-Current Electric Motors, of which the following is a specification.

My invention consists broadly in a novel type of alternating-current electric motor which is made dependent for its action upon the angular disposition of the inducing-coils thereof, said angular disposition being such that successive poles of like polarity are established slightly in advance or to one side of the poles of the field-magnet and armature-coils.

In order that my invention may be fully understood, reference is had to the accompanying drawings, in which—

Figure 1:
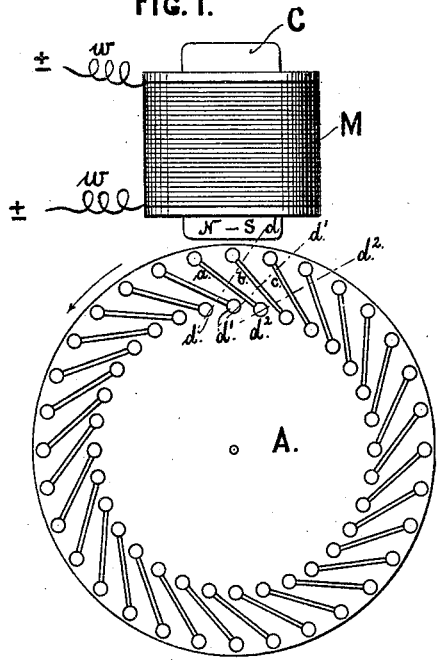
Figure 2:
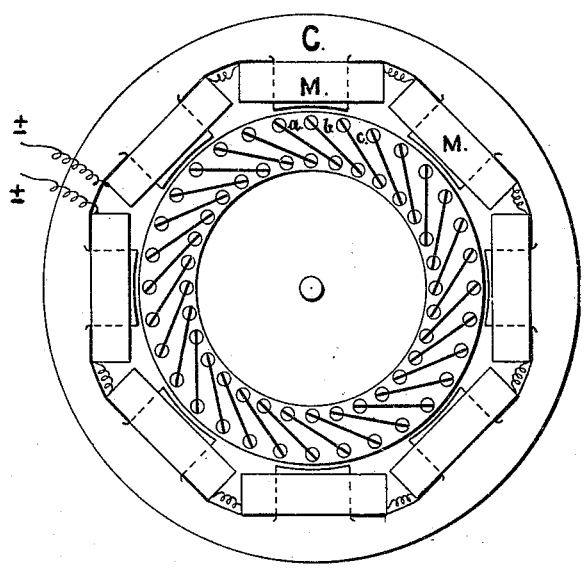

Figure 1 represents in diagrammatic view one form of my improved apparatus; and Fig. 2 illustrates diagrammatically a complete motor having a series of field-coils wound upon the internally-projecting poles of a well-known form of laminated field-magnet core, and provided with an armature or rotary part embodying the principles of my invention.

Referring to the drawings in detail and first to Fig. 1, M represents an electromagnet having a laminated core-piece C, the coils of said magnet being connected by conductors $w$ $w$ to the binding-posts of an ordinary alternating-current generator. (Not shown.) A represents the movable or rotary part, which consists preferably of a series of laminated disks laid side by side, the axial length of said armature being as in well known forms of machines approximately the same as the width of the magnet-core C. These armature-disks are perforated with two concentric rows of perforations, as shown, and $a$ $b$ $c$, &c., represent independent closed-circuit windings extending through the perforations and across the ends of the outer disks, the arrangement being such that said windings are placed at angles of preferably forty-five degrees to the radial lines of the disk, as shown.

Referring to Fig. 1 of the drawings, the operation of this improved form of apparatus is as follows: When the coil M is energized by an alternating current, one phase of the current produces, say north polarity at the inner end of the magnet-pole, thereby tending to establish in the armature A under the pole-piece a corresponding south polarity. At approximately the same time an induced current is set up in each of the short-circuited coils $a$ $b$ $c$ immediately adjacent to the pole-piece, which current, on account of the angular winding, necessarily tends to shift the polarity of the armature, so that it starts to rotate. In like manner the next or reverse current phase establishes a south pole at N S, and induced currents are set up in the same or adjacent coils in a reverse direction, causing rotation in the same direction as before.

In Fig. 2 is shown in diagrammatic view a complete motor involving the application of the generic principle of my invention, C being a field-magnet core of well-known form provided with a number of field-coils M M connected in series relation, and A the armature, the core thereof being of laminated rings laid side by side.

I do not limit myself to the specific mechanism hereinbefore described and illustrated in the accompanying drawings for effecting the rotation of the movable or rotary part of an alternating-current electric motor. I believe it is broadly new with me to so dispose the current-carrying windings of an alternating-current electric motor that there may be established between the stationary part and the rotary part thereof successive poles of like polarity slightly in advance or to one side of the pole-pieces of such stationary and rotary parts, whereby the repulsive action attributable to such similar poles will tend instantaneously to give rotation to the movable part and to continue such rotation, and my claims hereinafter made are of such generic scope as to include any apparatus which will effect this result.

Having thus described my invention, what I claim, and desire to secure by Letters Patent of the United States, is—

1. An alternating current electric motor having an inductive part provided with coils or windings disposed at angles to the radial lines of the core or axis of said part, and adapted through such angular disposition to establish repulsive poles on one side of the inducing pole or poles of a second inducing part.

2. An alternating current electric motor having two inductive parts provided with independent windings, the windings of one part being closed upon themselves in short circuit and disposed at angles to the radial lines of the axis or core thereof.

3. An alternating current electric motor having two sets of inductive coils, one of which sets is angularly disposed with relation to the other in such manner as to establish repulsive poles at one side, one of said sets of coils acting as an inducing primary circuit and the other as a movable or rotary secondary with relation thereto, said motion or rotation being due to the united action of the aforesaid established repulsive poles.

4. An alternating current electric motor having two sets of inductive coils, one of which acts as a primary and the other as a rotary secondary thereto, the coils of the secondary being closed upon themselves and disposed at angles to the radial lines of the axis about which they rotate.

In testimony whereof I have hereunto subscribed my name this 20th day of October, 1894.

ROBERT LUNDELL.

Witnesses:
C. J. KINTNER,
M. M. ROBINSON.